US012747907B2

(12) United States Patent
Kikuchi et al.

(10) Patent No.: US 12,747,907 B2
(45) Date of Patent: Sep. 29, 2026

(54) REFRIGERATOR HAVING DOOR POSITION ADJUSTMENT DEVICE

(71) Applicant: SAMSUNG ELECTRONICS CO., LTD., Suwon-si (KR)

(72) Inventors: Manabu Kikuchi, Yokohama (JP); Jun Yamashita, Yokohama (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 59 days.

(21) Appl. No.: 18/749,150

(22) Filed: Jun. 20, 2024

(65) Prior Publication Data

US 2024/0401869 A1 Dec. 5, 2024

Related U.S. Application Data

(63) Continuation of application No. PCT/KR2022/016434, filed on Oct. 26, 2022.

(30) Foreign Application Priority Data

Dec. 21, 2021 (JP) ................................ 2021-207499

(51) Int. Cl.
*F25D 23/02* (2006.01)
*E05D 7/04* (2006.01)

(52) U.S. Cl.
CPC ......... *F25D 23/028* (2013.01); *E05D 7/0423* (2013.01); *E05D 2007/0469* (2013.01); *E05Y 2900/31* (2013.01); *F25D 2323/024* (2013.01)

(58) Field of Classification Search
CPC ....... E05D 7/04; E05D 7/0415; E05D 7/0423; F25D 2323/024; F25D 23/028; A47B 95/00

(Continued)

(56) References Cited

U.S. PATENT DOCUMENTS 4,209,946 A * 7/1980 Akai ........................ E05D 7/083 16/245
5,203,115 A * 4/1993 Marinoni ................ E05D 7/081 16/236

(Continued)

FOREIGN PATENT DOCUMENTS

CN 116291090 A * 6/2023 ............... E05D 7/04
CN 219199597 U * 6/2023

(Continued)

OTHER PUBLICATIONS

English Abstract and claim of CN219199597 (Year: 2023).*

(Continued)

*Primary Examiner* — Janet M Wilkens
(74) *Attorney, Agent, or Firm* — CANTOR COLBURN LLP

(57) ABSTRACT

The disclosed refrigerator includes a cabinet and a door to open/close an opening of the cabinet. The door is rotatably supported by a hinge. A door position adjustment device is provided between the door and the hinge. The door position adjustment device adjusts steplessly at least the position of the door in a vertical direction. The door position adjustment device includes a vertical adjustment screw. The vertical adjustment screw includes a threaded portion. The vertical adjustment screw is provided between the door and the hinge and adjusts the position of the door in the vertical direction by a tightening amount and a loosening amount in the vertical direction.

13 Claims, 12 Drawing Sheets

(58) Field of Classification Search
USPC ......... 16/238, 240, 245, 235, 236, 247, 248; 312/405, 326, 329
See application file for complete search history.

(56) References Cited

U.S. PATENT DOCUMENTS

| | | | | | |
|---|---|---|---|---|---|
| 5,471,709 | A | * | 12/1995 | Lanzani | F25D 23/026 16/302 |
| 8,307,502 | B2 | * | 11/2012 | Bonomie | E05D 7/04 16/248 |
| 8,511,768 | B2 | * | 8/2013 | Brachert | E05D 7/0423 312/138.1 |
| 9,303,916 | B2 | * | 4/2016 | Ozyuksel | A47L 15/4251 |
| 9,605,457 | B2 | | 3/2017 | Humble | |
| 9,752,817 | B2 | | 9/2017 | Richards et al. | |
| 10,330,370 | B2 | | 6/2019 | Choi et al. | |
| 10,982,475 | B2 | | 4/2021 | Iwata | |
| 2004/0222725 | A1 | | 11/2004 | Park et al. | |
| 2008/0201902 | A1 | | 8/2008 | Moon et al. | |
| 2017/0198507 | A1 | | 7/2017 | Humble et al. | |

FOREIGN PATENT DOCUMENTS

| | | | | | |
|---|---|---|---|---|---|
| CN | 118066779 | A | * | 5/2024 | F25D 23/028 |
| CN | 118066780 | A | * | 5/2024 | F25D 23/028 |
| EP | 0647821 | B1 | | 7/1997 | |
| EP | 1278033 | B1 | | 8/2005 | |
| JP | 2522595 | B2 | | 2/1993 | |
| JP | 2002349118 | A | | 12/2002 | |
| JP | 2004324263 | A | | 11/2004 | |
| JP | 2008303645 | A | | 12/2008 | |
| JP | 2013072180 | A | | 4/2013 | |
| JP | 2013181306 | A | | 9/2013 | |
| JP | 6637190 | B2 | | 12/2019 | |
| KR | 19990063575 | A | | 7/1999 | |
| KR | 100277322 | B1 | | 2/2001 | |
| KR | 200277264 | Y1 | | 5/2002 | |
| KR | 101489246 | B1 | | 2/2015 | |
| KR | 20180069637 | A | * | 6/2018 | F16B 5/02 |

OTHER PUBLICATIONS

Extended European Search Report Issued in EP Application No. 22911572.0-1201; Mail Date Jan. 8, 2025; 9 Pages.

International Search Report corresponding to Application No. PCT/KR2022/016434; Dated Feb. 1, 2023.

* cited by examiner

REFRIGERATOR HAVING DOOR POSITION ADJUSTMENT DEVICE

CROSS-REFERENCE TO RELATED APPLICATIONS

This application is a continuation application, claiming priority under § 365(c), of International Application No. PCT/KR2022/016434, filed on Oct. 26, 2022, which is based on and claims the benefit of Japanese patent application number 2021-207499 filed on Dec. 21, 2021, in the Japanese Intellectual Property Office, the disclosures of which are incorporated by reference herein in their entireties.

TECHNICAL FIELD

The disclosure relates to a refrigerator having a door position adjustment device.

BACKGROUND ART

A design panel may be attached on an insulation door of a refrigerator, for example, a built-in refrigerator. The design panel may be replaceable. As such, by enabling replacement of the design panel, a user's free customization option is available, for example, to provide a sense of unity in the color, design, and the like of a door and cabinet.

In a refrigerator manufacturing process, such as an insulation foaming process, for example, dimensional unevenness of a door or cabinet may occur, resulting in misalignment between the door and the cabinet. During the manufacturing process, this misalignment can be covered with a design panel, but in the case of a refrigerator of a type where the design panel is replaceable, there is a problem in that this misalignment becomes noticeable when the design panel is replaced.

Furthermore, there is a risk that the door may sag due to the weight of items stored in the door, and thus, the design panel of the door may appear tilted or the misalignment between the door and the cabinet may become noticeable, which may deteriorate the design (exterior quality).

In order to ensure designability, a mechanism that allows the position of a door to be adjusted after delivery of a refrigerator is necessary. U.S. Pat. No. 8,511,768 discloses a door position adjustment mechanism that can adjust the vertical position of a door by inserting and removing one or more plates between the door and a hinge as needed.

DISCLOSURE

Technical Solution

A refrigerator according to an aspect of the disclosure includes a cabinet and a door to open/close an opening of the cabinet. The door may be rotatably supported by a hinge. A door position adjustment device is provided between the door and the hinge. The door position adjustment device may adjust at least the position of the door in a vertical direction steplessly. The stepless adjustment of a door position may be implemented through adjustment using a screw. For example, the door position adjustment device may include a vertical adjustment screw provided between the door and the hinge. The vertical adjustment screw may include a threaded portion. The vertical adjustment screw may adjust the vertical position of the door by a tightening amount and a loosening amount in the vertical direction.

A clothing care device according to an aspect of the disclosure may include a cabinet for storing clothes and a door to open/close an opening of the cabinet. A hinge may support the door to be rotatably with respect to the cabinet. A door position adjustment device to adjust the position of the door may be provided between the hinge and the door. The door position adjustment device may adjust at least the position of the door in a vertical direction steplessly. The stepless adjustment of a door position may be implemented through adjustment using a screw. For example, the door position adjustment device may include a vertical adjustment screw provided between the door and the hinge. The vertical adjustment screw may include a threaded portion. The vertical adjustment screw may adjust the vertical position of the door by a tightening amount and a loosening amount in the vertical direction.

MODE FOR INVENTION

Figure 1:
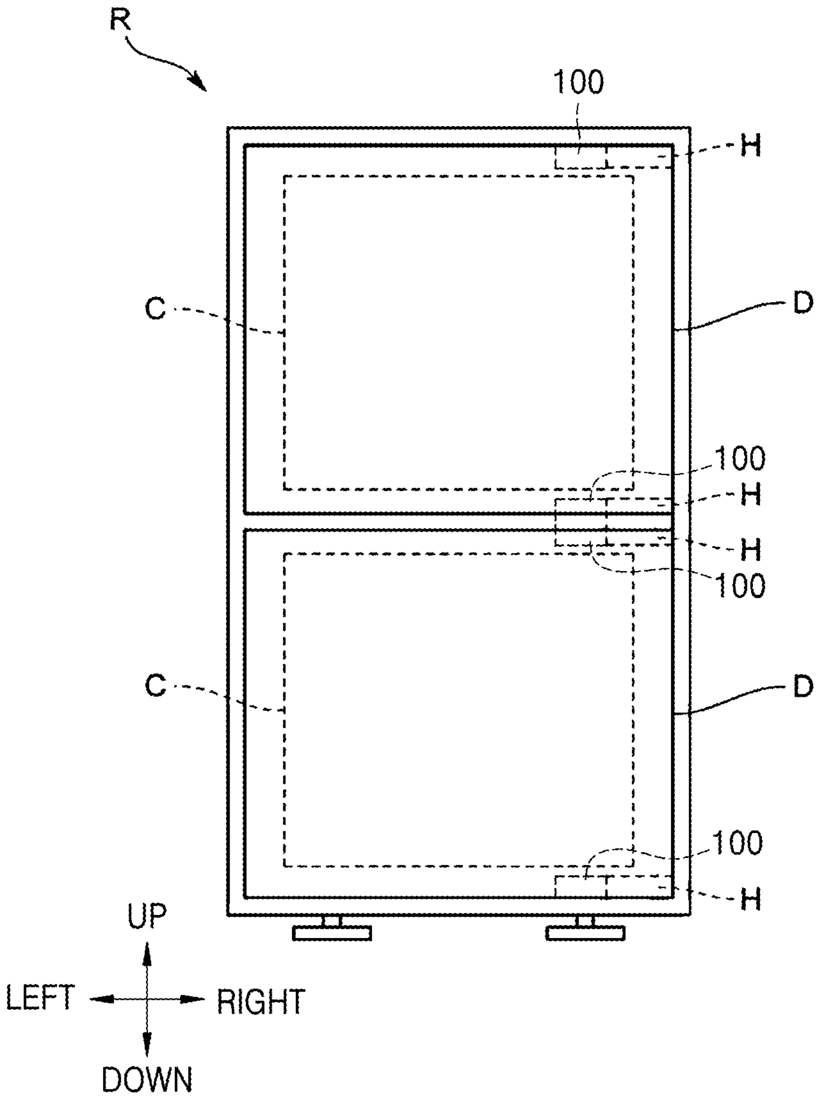
FIG. 1 is a schematic front view showing an overall configuration of a refrigerator according to an embodiment of the disclosure.

The terms used in the disclosure have been selected from currently widely used general terms in consideration of the functions in the disclosure. However, the terms may vary according to the intention of one of ordinary skill in the art, case precedents, and the advent of new technologies. Furthermore, for special cases, meanings of the terms selected by the applicant are described in detail in the description section. Accordingly, the terms used in the disclosure are defined based on their meanings in relation to the contents discussed throughout the specification, not by their simple meanings. When a part may "include" a certain constituent element, unless specified otherwise, it may not be construed to exclude another constituent element but may be construed to further include other constituent elements.

Embodiments of a refrigerator according to the disclosure are provided to further completely explain the disclosure to one of ordinary skill in the art to which the disclosure pertains, with reference to the drawings. However, the disclosure is not limited thereto and it will be understood that various changes in form and details may be made therein. In the drawings, a part that is not related to a description is omitted to clearly describe the disclosure and, throughout the specification, similar parts are referenced with similar reference numerals.

For a door position adjustment device according to the related art, in which one or more position adjustment plates are inserted, as necessary, between the door and the hinge, the adjustment of the position of a door is possible, step by step, by the thickness of the plate. Accordingly, the position of a door in a vertical direction is difficult to be finely adjusted. The disclosure provides a door position adjustment device capable of steplessly adjusting the position of a door at least in a vertical direction, and a refrigerator adopting the same.

FIG. 1 is a schematic front view of a refrigerator R according to an embodiment of the disclosure. In the following drawings, the refrigerator R is shown as being installed in a vertical direction. In a front-rear direction, the front side refers to a door side, and the rear side refers to a cabinet side. In a left-right direction, the left side refers to a left direction when the door is seen in front of the door, and the right side refers to a right direction when the door is seen in front of the door.

Referring to FIG. 1, the refrigerator R according to an embodiment of the disclosure may include one or a plurality of cabinets C, a door D of a single door type or a double door type installed on the cabinet C, and a hinge H rotatably supporting the door D. The cabinet C may include a refrigerator or fridge compartment, a freezer compartment, a vegetable compartment, an ice compartment, and the like. The cabinet C may have a box shape with one open surface. The door D opens/closes one open surface of the cabinet C. The hinge H supports the door D to be rotatable with respect to the cabinet C about a rotation axis defined through the hinge H. A door position adjustment device 100 is provided between the door D and the hinge H to adjust the position of the door D.

Figure 2:
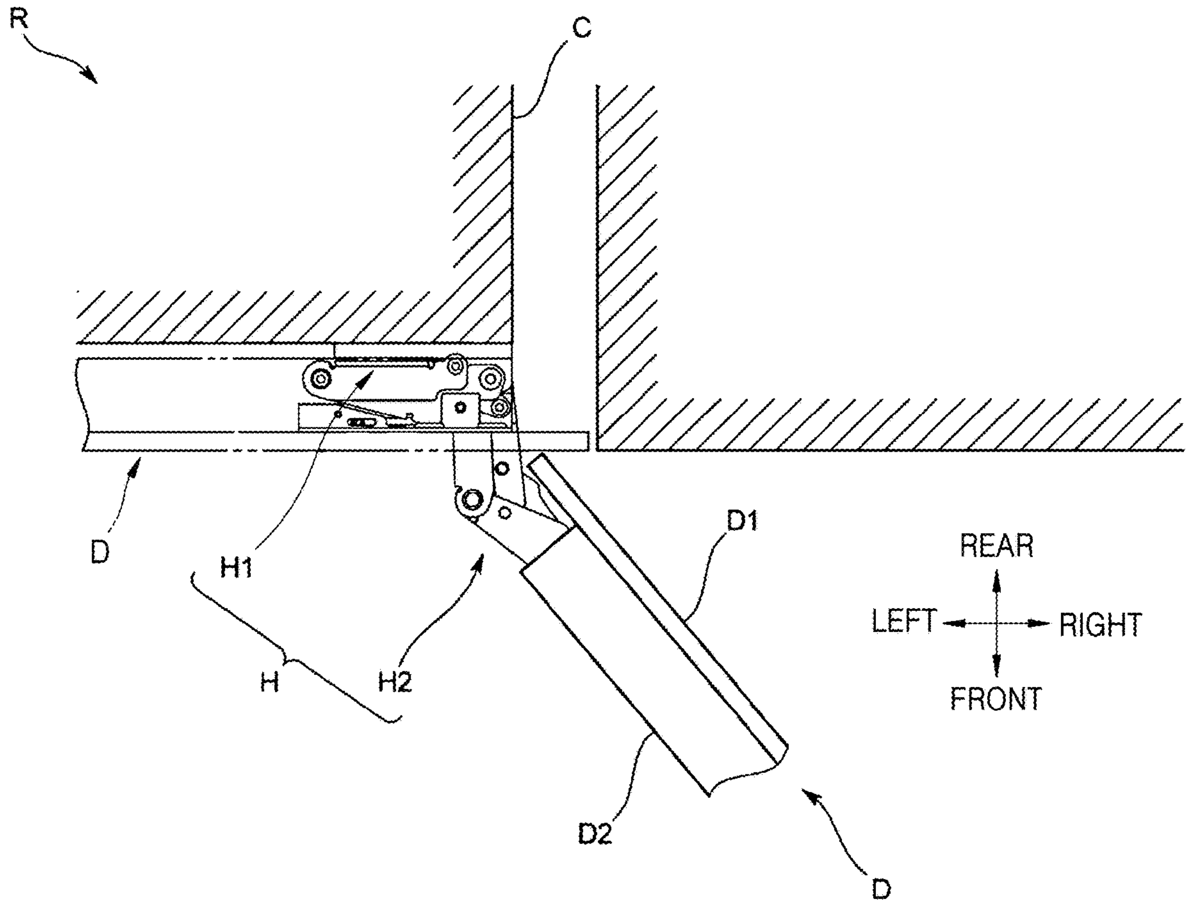
FIG. 2 is a schematic plan view of the refrigerator according to the embodiment of the disclosure illustrated in FIG. 1.

FIG. 2 is a schematic plan view of the refrigerator R according to the embodiment of the disclosure illustrated in FIG. 1. Referring to FIG. 2, the hinge H may include a fixed arm H1 that is attached to the cabinet C and at least one movable arm H2 that is attached to the door D and that is simultaneously movable relative to the fixed arm H1. In an embodiment, the hinge H may be a multi-axis hinge that rotates and pushes the door D toward the front side. By using the multi-axis hinge H, a design panel D1 located on a front portion of the door D may be located on the same plane as a wall surface of a kitchen and the like, or when another cabinet is located adjacent thereto, a design panel of the cabinet and the design panel D1 of the door D may be located on the same plane. In other words, according to an embodiment of the disclosure, the refrigerator R may be arranged such that the design panel D1 of the door D is aligned with a wall surface or a design panel of another adjacent cabinet in a front-rear direction.

The refrigerator R may have a structure to replace the design panel D1 of the door D. For example, a structure to attach or detach the design panel D1 may be provided on a main body portion D2 of the door D. Accordingly, the design panel D1 of a desirable color or design may be mounted on the main body portion D2 of the door D. When the design panel D1 has the same size as the front surface of the main body portion D2, even when the door D and the cabinet C may be misaligned due, for example, to a sagging of the door D that is caused by the use of the multi-axis hinge H, the misalignment may not be covered by the design panel D1. As such, when the design panel D1 and the main body portion D2 have the same size, the misalignment between the door D and the cabinet C is noticeable not only during the replacement of the design panel D1, but also while the design panel D1 is installed on the door D.

Figure 3:
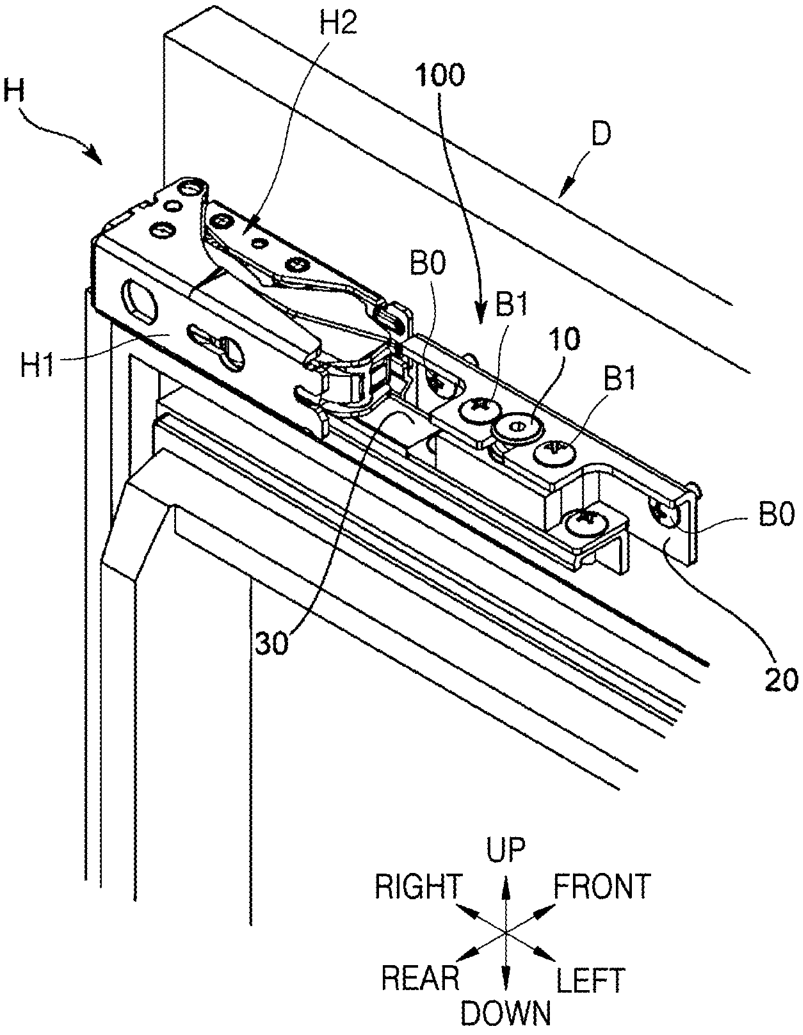
FIG. 3 is a schematic perspective view of a door position adjustment device according to an embodiment of the disclosure.
Figure 4:
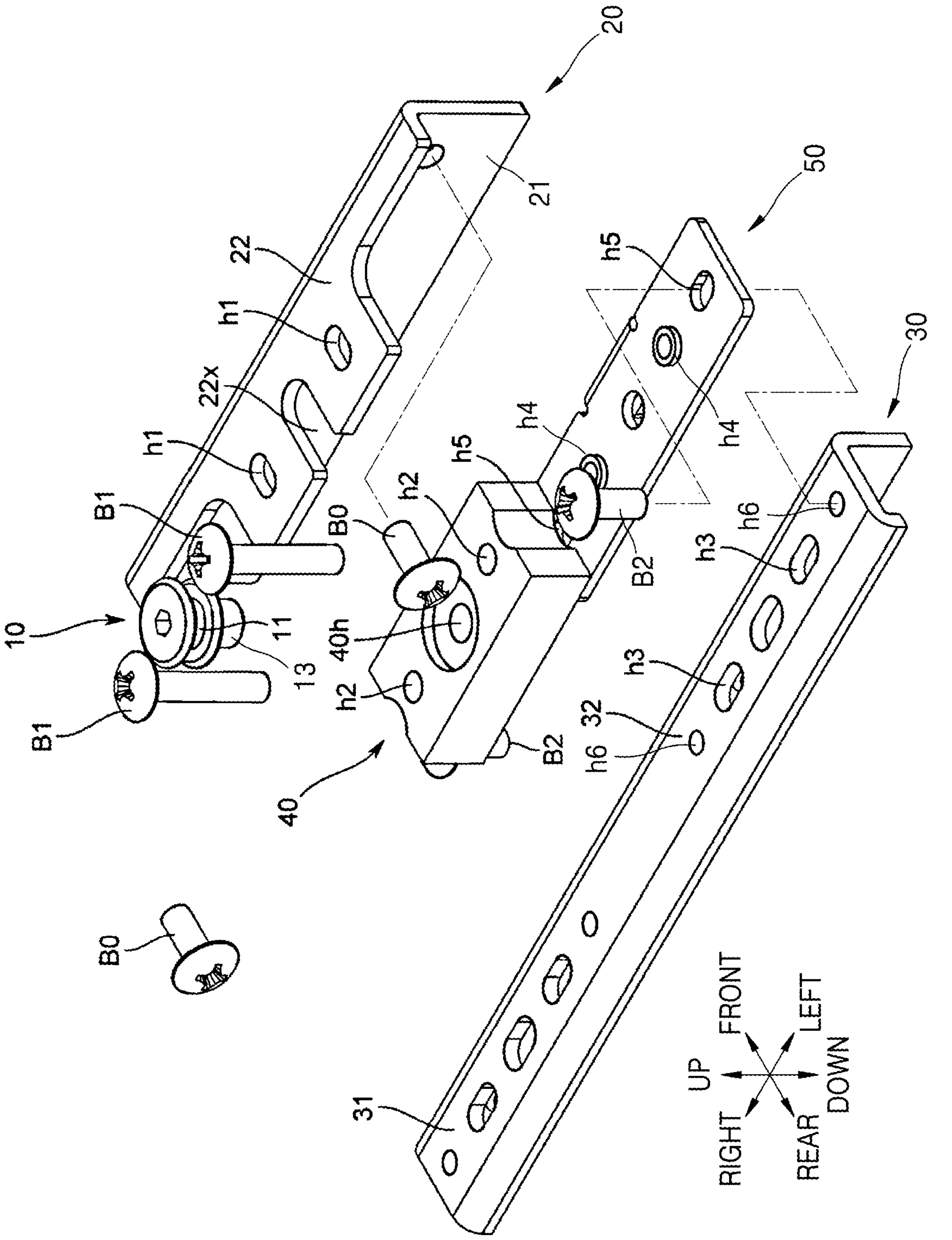
FIG. 4 is an exploded perspective view of the door position adjustment device according to the embodiment of the disclosure illustrated in FIG. 3.

The refrigerator R of the disclosure includes the door position adjustment device 100 (see FIG. 1) to be capable of removing or mitigating the misalignment described above. FIG. 3 is a schematic perspective view of the door position adjustment device 100 according to an embodiment of the disclosure. FIG. 4 is an exploded perspective view of the door position adjustment device 100 according to the embodiment of the disclosure illustrated in FIG. 3. Referring to FIGS. 3 and 4, the refrigerator R includes the door position adjustment device 100 that is provided between the hinge H and the door D to adjust the position of the door D steplessly, that is, continuously or without discontinuous steps at least in a vertical direction.

The hinge H and the door position adjustment device 100 may be provided in each of the upper and lower sides of the door D. As the two door position adjustment devices 100 respectively provided in the upper and lower sides of the door D have a vertically symmetrical structure, in the following description, the door position adjustment device 100 provided in the upper right side of the door D is described in detail.

The door position adjustment device 100 may include a screw member 10 (hereinafter, referred to as the vertical adjustment screw 10), a door base 20 that is fixed to the door D, and a hinge base 30 that is fixed to the hinge H. Some components of the door position adjustment device 100 may be, as illustrated in FIGS. 3 and 4, arranged at a center side of the door D compared with the hinge H in the width direction of the door D, that is, in the left-right direction, next to the hinge H when the door D is closed.

The vertical adjustment screw 10 includes a threaded portion 13. The vertical adjustment screw 10 is provided between the door D and the hinge H to adjust the position of the door D in the vertical direction by a tightening amount and a loosening amount in the vertical direction. In an example, the vertical adjustment screw 10 may be provided between the door base 20 and the hinge base 30. The vertical adjustment screw 10 is connected to either one of the door base 20 and the hinge base 30 and is movable in the vertical direction relative to the other one of the door base 20 and the hinge base 30. For example, the vertical adjustment screw 10 may include the threaded portion 13 that is directly or indirectly supported or fastened to the other one of the door base 20 and the hinge base 30. By releasing or fastening the vertical adjustment screw 10, either one of the door base 20 and the hinge base 30 may be moved, with the vertical adjustment screw 10, in the vertical direction relative to the other one of the door base 20 and the hinge base 30.

In an example, as illustrated in FIGS. 3 and 4, the vertical adjustment screw 10 may be connected to the door base 20 and fastened to the hinge base 30 so as to be moved in the vertical direction relative to the hinge base 30. The vertical adjustment screw 10 may include a connection portion 11. The connection portion 11 may be connected to the door base 20 to restrict the movement of the door base 20 in the vertical direction. For example, the connection portion 11 may be formed to be narrow around a head portion of the vertical adjustment screw 10, that is, between the head portion and the threaded portion 13. As the connection portion 11 is caught in a notch 22*x* of the door base 20, the connection portion 11 may be connected to the door base 20. The movement of the door base 20 in the vertical direction is restricted by the connection portion 11, and the door base 20 is moved with the vertical adjustment screw 10 in the vertical direction according to the movement of the vertical adjustment screw 10 in the vertical direction. Accordingly, when the connection portion 11 is connected to the door base 20, the door base 20 is moved in the vertical direction by a tightening amount and a loosening amount of the vertical adjustment screw 10 with respect to the hinge base 30. When the adjustment is completed, the door base 20 may be fixed to an adjusted position as the movement of the door base 20 in the vertical direction is restricted by the connection portion 11.

The door base 20 may include a first door base 21 coupled to the door D and a second door base 22 connected to the vertical adjustment screw 10. For example, the first door base 21 may have a flat plate shape extending in the width direction of the door D, that is, in the left-right direction. The first door base 21 may be placed on a surface of the door D facing the inside of the cabinet C, for example, to be fixed on the door D by a screw member B0 such as a bolt and the like. The second door base 22 may be bent from an upper edge of the first door base 21 to the inside of the cabinet C, that is, to the rear side. The notch 22*x* may be provided in the second door base 22. The shape of the notch 22*x* is not particularly limited unless the notch 22*x* may be connected to the connection portion 11 of the vertical adjustment screw 10 to restrict the movement of the door base 20 in the vertical direction. For example, referring to FIGS. 3 and 4, the notch 22*x* may have a U-shape that is opened toward the inside of the cabinet C.

The hinge base 30 may include a first hinge base 31 that is connected to the movable arm H2 of the hinge H and a second hinge base 32 on which the vertical adjustment screw 10 described above is supported or fastened. The first hinge base 31 may have a flat plate shape extending in the width direction of the door D, that is, in the left-right direction. The first hinge base 31 may be located between the lower surface of the hinge H and the upper surface of the door D, and is fixed to the hinge H. For example, the first hinge base 31 may be fixed to the movable arm H2 of the hinge H by a screw member, such as a bolt and the like, or cogging and the like. The second hinge base 32 may have a flat plate shape extending in a width direction from the first hinge base 31 toward the center side of the door D, that is, in the left direction. The second hinge base 32 may face the second door base 22 in the vertical direction.

The door position adjustment device 100 according to an embodiment of the disclosure may include an adjustor block 40 that is provided between the door base 20 and the hinge base 30. The adjustor block 40 may be provided between the second door base 22 and the second hinge base 32. The adjustor block 40 may be supported or coupled to the second hinge base 32. A screw hole 40*h*, to which the vertical adjustment screw 10 is screw-coupled, is formed in the adjustor block 40. The threaded portion 13 of the vertical adjustment screw 10 may be fastened to or in the screw hole 40*h*.

When the vertical adjustment screw 10 is loosened from the adjustor block 40, the vertical adjustment screw 10 is moved upwards relative to the hinge base 30. As the vertical adjustment screw 10 and the door base 20 are connected to each other by the connection portion 11 and the notch 22*x*, the door base 20 is moved upwards and the door D, to which the door base 20 is fixed, is lifted upwards as well. When the vertical adjustment screw 10 is tightened into the adjustor block 40, the door base 20 is moved downwards with the vertical adjustment screw 10, and thus, the door D is lowered as well. As such, as the door D is moved in the vertical direction relative to the hinge base 30 by tightening or loosening the vertical adjustment screw 10, the door D may be moved in the vertical direction relative to the movable arm H2 of the hinge H, that is, the cabinet C.

When the door D is not moved in the vertical direction, for example, after the adjustment of the position of the door D in the vertical direction, the door base 20 needs to not be moved in the vertical direction. For example, the door base 20 may be fixed to the hinge base 30.

Referring to FIG. 4, first to third through holes h1, h2, and h3 that are aligned with one another in the vertical direction are formed in the door base 20, the adjustor block 40, and the hinge base 30, respectively. For example, the first to third through holes h1, h2, and h3 are aligned with one another in the vertical direction. A screw member B1 may be fastened to the third through hole h3 by passing through the first through hole h1 and through the second through hole h2 such that the door base 20, the adjustor block 40, and the hinge base 30 may be coupled to one another. In this case, at least the third through hole h3 may be a screw fastening hole in which a female threaded portion is formed to register with threading of the screw member B1. Accordingly, as the door base 20 is fixed to the hinge base 30, the door D may be fixed in the vertical direction. For example, the first through hole h1 may be provided as a pair of first through holes h1 formed in the door base 20 at opposite sides of the notch 22X in the left-right directions. Similarly, the second and third through holes h2 and h3 may each be provided as a pair of second and third through holes h2 and h3 formed in the adjustor block 40 and the hinge base 30, respectively, at positions corresponding to the pair of first through holes h1.

Figure 5:
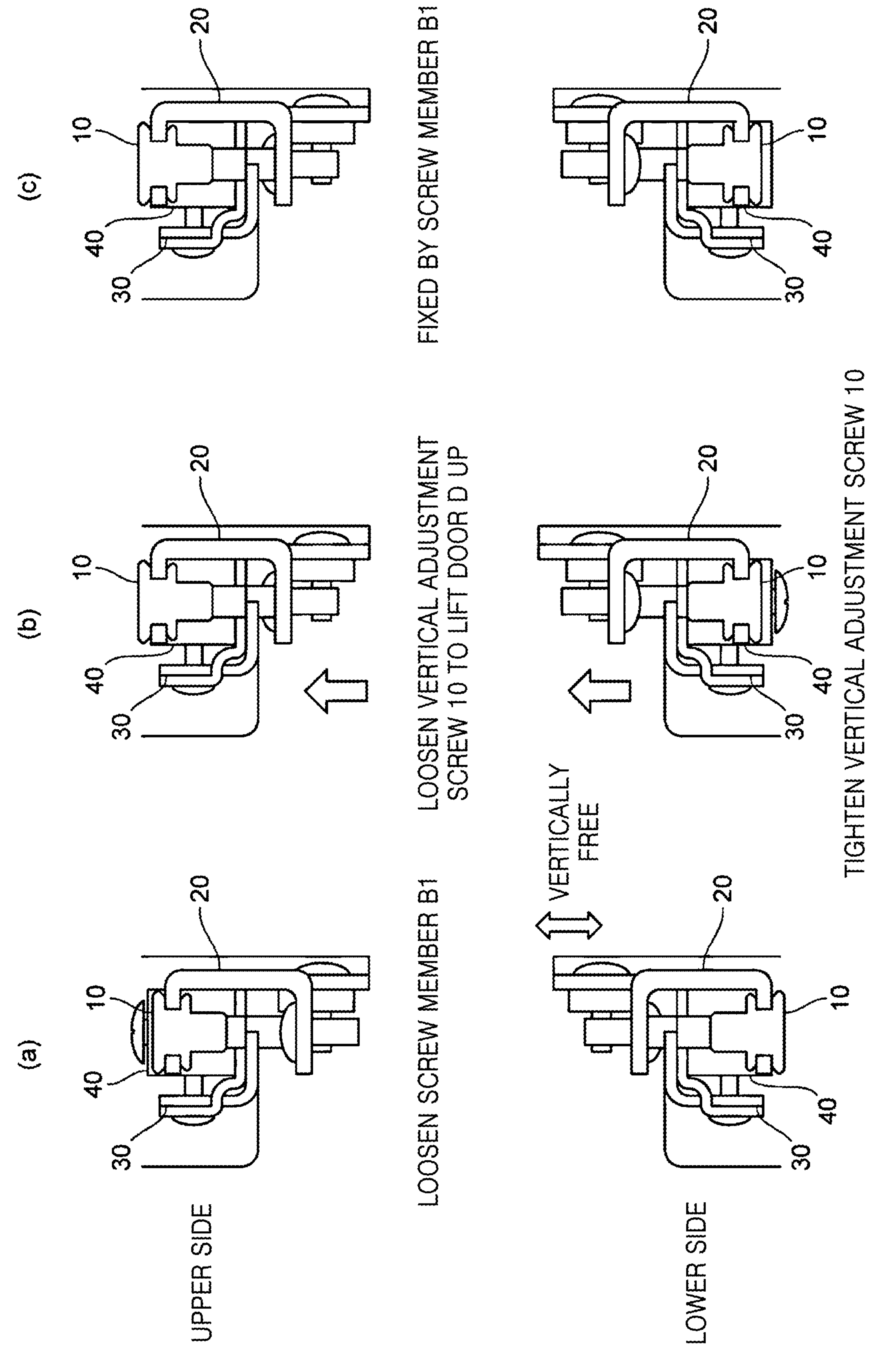
FIGS. 5A, 5B and 5C illustrate a process of adjusting a vertical position of a door by the door position adjustment device according to the embodiment of the disclosure illustrated in FIG. 3.

FIGS. 5A, 5B and 5C illustrate a process of adjusting the vertical position of the door D by the door position adjustment device 100 according to the embodiment of the disclosure illustrated in FIG. 3. The process of adjusting the vertical position of the door D is described with reference to FIGS. 5A, 5B and 5C. As described above, the door position adjustment device 100 is installed on each of the upper and lower sides of the door D. Furthermore, as the door base 20 is fixed to the hinge base 30 by the screw member B1, for example, even when the position of the door D in the vertical direction is adjusted by using the vertical adjustment screw 10 in the upper side, the door D may not be moved up and down because the door base 20 in the lower side is fixed to the hinge base 30 by the screw member B1. Thus, to adjust the position of the door D in the vertical direction, first, it is necessary to loosen the screw member B1 in the door position adjustment device 100 in each of the upper and lower sides of the door D. As a result, as illustrated in the diagram of FIG. 5A, the door base 20 in each of the upper and lower sides becomes free with respect to the hinge base 30, When the door D is moved in the vertical direction by using the vertical adjustment screw 10 in the upper side, according thereto, the door base 20, the vertical adjustment screw 10, and the adjustor block 40 in the lower side are moved together relative to the hinge base 30 in the lower side. Accordingly, the position of the door D in the vertical direction may be adjusted. For example, as illustrated in the diagram of FIG. 5B, when the vertical adjustment screw 10 in the upper side is loosened, the door D is moved upwards, and according thereto, the door base 20, the vertical adjustment screw 10, and the adjustor block 40 in the lower side are moved upwards together. In other words, the door base 20, the vertical adjustment screw 10, and the adjustor block 40 in the lower side together are closer to the hinge base 30 at the lower side.

Then, the adjustor block 40 in the lower side is pressed against the hinge base 30 by using the vertical adjustment screw 10 in the lower side, and in this state, by tightening the screw member B1 in the door position adjustment device 100 in each of the upper and lower sides, the door base 20 in each of the upper and lower sides is fixed to the hinge base 30, and thus, as illustrated in the diagram of FIG. 5C, the adjustment of the position of the door D in the vertical direction is completed.

The door position adjustment device 100 according to an embodiment of the disclosure may have a structure to steplessly (i.e., continuous or without discontinuous steps) adjust the position of the door D in the front-rear direction, in addition to the adjustment of the position of the door D in the vertical direction. The door position adjustment device 100 according to an embodiment of the disclosure may have a structure to steplessly adjust the position of the door D in the left-right direction. The structure to adjust the position of the door D in the front-rear direction and the left-right direction is described below with reference to FIG. 4.

First, the structure to adjust the position of the door D in the front-rear direction is described. Referring to FIG. 4, the through hole h1, through which the screw member B1 (hereinafter, referred to as the front-rear adjusting and fixing screw B1) passes, is formed in the door base 20. The through hole h1 has a slot shape extending in the front-rear direction. Furthermore, as described above, the notch 22*x* has a shape with an opening toward the cabinet C. The front-rear adjusting and fixing screw B1 may be fastened to the second through hole h2 by passing through the first through hole h1. The front-rear adjusting and fixing screw B1 may be fastened to the third through hole h3 by passing through the first and second through holes h1 and h2. Accordingly, while the front-rear adjusting and fixing screw B1 is loosened, the door base 20 is moved relative to the hinge base 30 within a range of the length of the first through hole h1 having a slot shape in the front-rear direction, precisely within a range of a length obtained by subtracting the diameter of the front-rear adjusting and fixing screw B1 from the length of the first through hole h1 in the front-rear direction, and thus, the front-rear adjusting and fixing screw B1 may be tightened. As the door D is moved in the front-rear direction according to the movement of the door base 20, the position of the door D in the front-rear direction may be adjusted.

Next, the structure to adjust the position of the door D in the left-right direction is described. Referring to FIG. 4, the door position adjustment device 100 may further include a slide plate 50 that is provided between the door base 20 and the hinge base 30. The slide plate 50 may be coupled to the hinge base 30 to be slidable in the left-right direction.

The slide plate 50 may have, for example, a flat plate shape, and is provided between the adjustor block 40 and the hinge base 30. The adjustor block 40 may be fixedly coupled to the slide plate 50. For example, fourth through holes h4 that are aligned in the vertical direction with the first and second through holes h1 and h2 provided in the door base 20 and the adjustor block 40, respectively, are provided in the slide plate 50. A female-screw, to which the front-rear adjusting and fixing screw B1 is fastened, may be provided in each of the fourth through holes h4. The front-rear adjusting and fixing screw B1 may be fastened to a corresponding one of the fourth through holes h4 by passing through the first through hole h1 and the second through hole h2.

The slide plate 50 may be coupled to the hinge base 30 to be movable in the left-right direction. Fifth through holes h5 are provided in the slide plate 50. The fifth through holes h5 may have a slot shape extending in the left-right direction. Sixth through holes h6 respectively aligned with the fifth through holes h5 are provided in the hinge base 30. A female-screw, to which a screw member B2 (hereinafter, referred to as the left-right adjusting and fixing screw B2) is fastened, may be provided in a corresponding one of the sixth through holes h6. The left-right adjusting and fixing screw B2 is fastened to a corresponding one of the sixth through holes h6 by passing through a corresponding one of the fifth through holes h5. Accordingly, the slide plate 50 may be moved relative to the hinge base 30 in the left-right direction and fixed thereto, the slide plate 50 being moved by the length of the fifth through holes h5 having a slot shape in the left-right direction, precisely by the length obtained by subtracting the diameter of the left-right adjusting and fixing screw B2 from the length of the fifth through holes h5 in the left-right direction.

The door base 20 is coupled to the adjustor block 40 by the vertical adjustment screw 10. Furthermore, the door base 20 is coupled to the slide plate 50 with the adjustor block 40 by the front-rear adjusting and fixing screw B1. Accordingly, the adjustor block 40, the door base 20, and the door D may be integrally moved in the left-right direction according to the movement of the slide plate 50. The third through hole h3 provided in the hinge base 30 may have a slot shape extending in the left-right direction so as to not interfere with the front-rear adjusting and fixing screw B1 having passed through the slide plate 50 in the process of adjusting the position in the left-right direction.

For the door position adjustment device 100 including the slide plate 50, a process of adjusting the position of the door D in the vertical direction is described briefly with reference to FIGS. 5A, 5B and 5C. First, in each of the upper and lower sides of the door D, the front-rear adjusting and fixing screw B1 is loosened in the door position adjustment device 100, and thus, as illustrated in the diagram of FIG. 5A, the door base 20 in each of the upper and lower sides becomes free in the vertical direction with respect to the slide plate 50 fixed to the hinge base 30. Next, for example, as illustrated in the diagram of FIG. 5B, when the vertical adjustment screw 10 in the upper side is loosened, the door D is moved upwards, and according thereto, the door base 20, the vertical adjustment screw 10, and the adjustor block 40 in the lower side are moved upwards together. In other words, the door base 20, the vertical adjustment screw 10, and the adjustor block 40 in the lower side are close together to the slide plate 50 in the lower side. The adjustor block 40 in the lower side is pressed against the slide plate 50 by using the vertical adjustment screw 10 in the lower side, and in this state, the front-rear adjusting and fixing screw B1 is tightened in the door position adjustment device 100 in each of the upper and lower sides so that the door base 20 in each of the upper and lower sides is fixed to the slide plate 50, and as illustrated in the diagram of FIG. 5C, the adjustment of the position of the door D in the vertical direction is completed.

For the refrigerator R according to an embodiment of the disclosure described above, as the position of the door D in the vertical direction is adjusted by using the vertical adjustment screw 10, the position of the door D may be steplessly adjusted in the vertical direction. For example, for the refrigerator R of a built-in type, appearance quality (designability) may be guaranteed by removing the inclination of the door D, a step in the vertical direction from an adjacent cabinet, and the like.

For the refrigerator R according to an embodiment of the disclosure, as the door D can be moved in the front-rear direction, the door D may be aligned in parallel with another door D or, for example, a wall surface of a kitchen, located adjacent thereto in the vertical direction or in the left-right direction. For the refrigerator R according to an embodiment of the disclosure, as the door D can be moved in the left-right direction, a gap from another door D or, for example, a wall surface of a kitchen adjacent in the left-right direction may be equalized.

For the refrigerator R according to an embodiment of the disclosure, the door position adjustment device 100 is installed in the upper or lower sides of the door D at a position covered by the design panel D1. As the door position adjustment device 100 capable of adjusting the position in three directions of up-down, left-right, and front-rear is accommodated in a limited space, appearance quality (designability) may be guaranteed in this sense too.

As the door position adjustment device 100 may be assembled to the door D and the hinge H by the door base 20 fixed to the door D, the hinge base 30 fixed to the hinge H, or the like, without design change to the existing hinge H, not only the door position adjustment device 100 may be employed, but also the position of the door D may be adjusted while maintaining the strength of the hinge H.

As the door position adjustment device 100 is arranged next to the hinge H in the left-right direction while the door D is closed, interference between a gasket arranged in front of the hinge H and the door position adjustment device 100 may be prevented.

As the door position adjustment device 100 is installed in each of the upper and lower sides of the door D, the door position adjustment device 100 in each of the upper and lower sides may receive the load of the door D, and fine position adjustment of the door D is possible.

As a multi-axis hinge that rotates and pushes the door D to the front side is used as the hinge H, while increasing an open angle of the door D, the position of the design panel D1 may be aligned in parallel with another adjacent door D or, for example, a wall surface of a kitchen, and thus, appearance quality (designability) may be guaranteed.

The multi-axis hinge, unlike a one-axis hinge, includes a plurality of link members and a plurality of rotation axes, door sagging may easily occur in the refrigerator R using the multi-axis hinge, compared with a refrigerator using a one-axis hinge. Accordingly, in the refrigerator R using a multi-axis hinge, the above-described effects of the door position adjustment device 100 may be more significantly exhibited.

The structure of the door position adjustment device 100 is not limited to the descriptions described above. For example, although the door position adjustment device 100 described above moves the door D in the vertical direction and also in the front-rear direction and in the left-right direction, the disclosure is not necessarily limited to the front-rear direction and also to the left-right direction. For the adjustment of the position in the front-rear direction, the third through hole h3 of the hinge base 30 may have a slot shape extending in the front-rear direction instead of the first through hole h1 of the door base 20. Furthermore, for the adjustment of the position in the left-right direction, the sixth through hole h6 of the hinge base 30 may have a slot shape extending in the left-right direction instead of the fifth through hole h5 of the slide plate 50. In addition, any one or both of the structure to adjust the position of the door D in the front-rear direction or the structure to adjust the position of the door D in the left-right direction may have a shape differing from a slot shape. For example, the structure to adjust the position of the door D in the front-rear direction and/or the structure to adjust the position of the door D in the left-right direction may be a structure that uses a screw member that is the same as or similar to the vertical adjustment screw 10, likewise the structure to adjust the position of the door D in the vertical direction, or a structure that uses eccentric cam, and the like.

Figure 6:
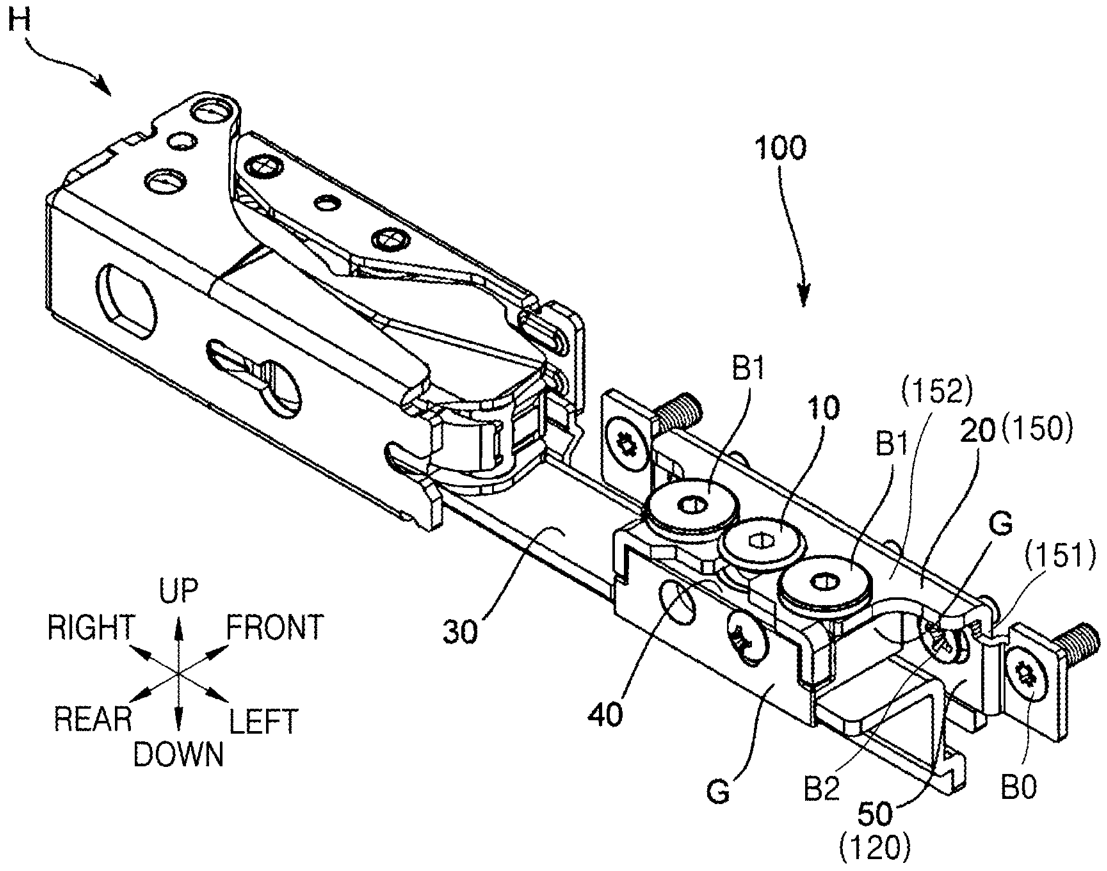
FIG. 6 is a perspective view of the door position adjustment device according to an embodiment of the disclosure.

FIG. 6 is a perspective view of the door position adjustment device 100 according to an embodiment of the disclosure. Referring to FIG. 6, the door position adjustment device 100 may include a guide portion G that guides the movement in the left-right direction and/or in the front-rear direction. Although, in the embodiment described above, the slide plate 50 is provided between the adjustor block 40 and the hinge base 30, as illustrated in FIG. 6, the slide plate 50 may be provided between the adjustor block 40 and the door base 20. In this case, the adjustor block 40 and the door base 20 may be fixed to the hinge base 30. The slide plate 50 may be fixed to the door base 20 by the left-right adjusting and fixing screw B2 to be slidable in the left-right direction. The coupling relationship between the slide plate 50 and the door base 20 is the same as that between the slide plate 50 and the hinge base 30 in the embodiment described above. The slide plate 50 may be fixed to the door D by the screw member B0. The front-rear adjusting and fixing screw B1 may be a screw of the same type as the vertical adjustment screw 10. The left-right adjusting and fixing screw B2 may also be a screw of the same type as the vertical adjustment screw 10.

In the door position adjustment device 100 according to the embodiment illustrated in FIG. 6, the slide plate 50 is coupled to the door D. Accordingly, when a door base is defined as a member that is coupled to the door, in the door position adjustment device 100 according to the embodiment illustrated in FIG. 6, the slide plate 50 is the door base. In this point of view, the door position adjustment device 100 according to the embodiment illustrated in FIG. 6 is described again as follows. In the following description, the door base and the slide plate are described by reference numerals in parenthesis in FIG. 6.

A door base 120 is coupled to the door D (not shown) by, for example, the screw member B0. The door base 120 may have a flat plate shape extending, for example, in the width direction of the door D, that is, in the left-right direction. A slide plate 150 may include a first plate 151 coupled to the door base 120 and a second plate 152 coupled to the vertical adjustment screw 10. For example, the first plate 151 may have a flat plate shape extending in the width direction of the door D, that is, in the left-right direction. The first plate 151 is accommodated on a surface of the door D facing the inside of the cabinet C and may be fixed to the door D by the screw member B0, such as a bolt and the like. The slide plate 150 may be coupled to the door base 120 by, for example, the left-right adjusting and fixing screw B2 to be slidable in the left-right direction. Although it is not illustrated in the drawings, a fifth through hole (h5 in FIG. 4) having a slot shape in the left-right direction is provided in the door base 120, and a sixth through hole (h6 in FIG. 4), to which the left-right adjusting and fixing screw B2 having passed through the fifth through hole (h5 in FIG. 4) is fastened, is provided in the slide plate 150, for example, the first plate 151.

The second plate 152 may be bent from the upper edge of the first plate 151 to the inside of the cabinet C, that is, to the rear side. A notch (22*x* in FIG. 4) may be provided in the second plate 152. For example, as illustrated in FIGS. 3 and 4, the notch 22*x* may have a U shape opened to the inside of the cabinet C. A first through hole (h1 in FIG. 4), through which the front-rear adjusting and fixing screw B1 passes, is formed in the slide plate 150, for example, the second plate 152. The first through hole h1 has a slot shape extending in the front-rear direction.

The adjustor block 40 is provided between the second plate 152 and the hinge base 30. The screw hole 40*h*, to which the vertical adjustment screw 10 is screw-coupled, is formed in the adjustor block 40. The threaded portion 13 of the vertical adjustment screw 10 is fastened to the screw hole 40*h*. The second and third through holes h2 and h3 that are aligned with the through hole h1 in the vertical direction are formed in the adjustor block 40 and the hinge base 30. As the front-rear adjusting and fixing screw B1 is fastened to the third through hole h3 by passing through the first through hole h1 and the second through hole h2, the slide plate 150, the adjustor block 40, and the hinge base 30 may be coupled to one another. In this case, at least the third through hole h3 may be a screw fastening hole in which a female threaded portion is formed. According to such a configuration, except that the door base 120 is capable of sliding in the left-right direction with respect to a slide base 150, the door position adjustment device 100 in FIG. 6 is substantially the same as the door position adjustment device 100 according to the embodiment illustrated in FIGS. 2 to 5.

Figure 7A:
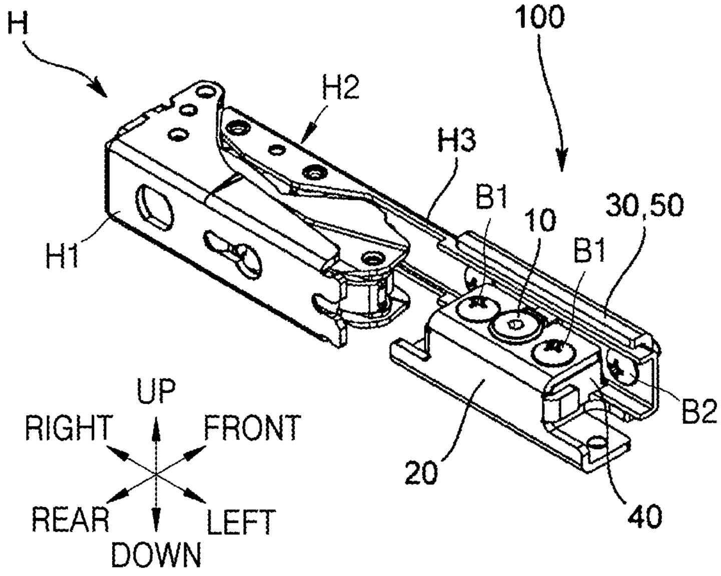
FIG. 7A is a perspective view of the door position adjustment device according to an embodiment of the disclosure.
Figure 7B:
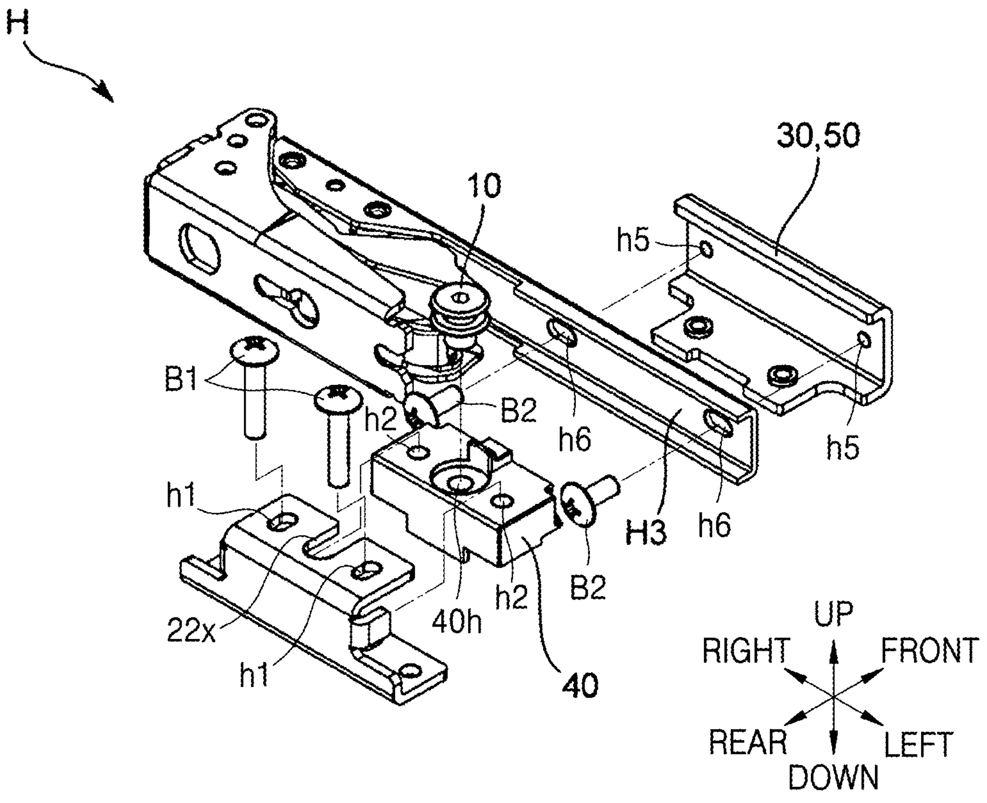
FIG. 7B is an exploded perspective view of the door position adjustment device according to the embodiment of the disclosure illustrated in FIG. 7A.

In an example, by changing the shapes of the components of the hinge H, the components of the hinge H may perform parts of the functions of the door position adjustment device 100. FIG. 7A is a perspective view of the door position adjustment device 100 according to an embodiment of the disclosure. FIG. 7B is an exploded perspective view of the door position adjustment device 100 according to the embodiment of the disclosure illustrated in FIG. 7A.

Referring to FIGS. 7A and 7B, the component of the hinge H, for example, the movable arm H2, extends toward the center side of the door D. In other words, the movable arm H2 may include an extension portion H3 extending toward the center side of the door D. The sixth through hole h6 having a slot shape extending in the left-right direction is formed in the extension portion H3 The left-right adjusting and fixing screw B2 is fastened to the fifth through hole h5 provided in the slide plate 50 by passing through the sixth through hole h6. Accordingly, the slide plate 50 is fixed to the extension portion H3 by the left-right adjusting and fixing screw B2 to be slidable in the left-right direction. Members having the same functions as those of the members described with reference to FIGS. 2 to 5 are indicated by the same reference numerals and redundant descriptions thereof are omitted. With the above configuration, the hinge H may function as the hinge base 30, and thus, the number of components may be reduced so that the door position adjustment device 100 and the refrigerator R adopting the same may be made compact at low costs. In another point of view, it may be understood that the slide plate 50 may also have the functions of the hinge base and the slide base described with reference to FIGS. 2 to 5.

Figure 8:
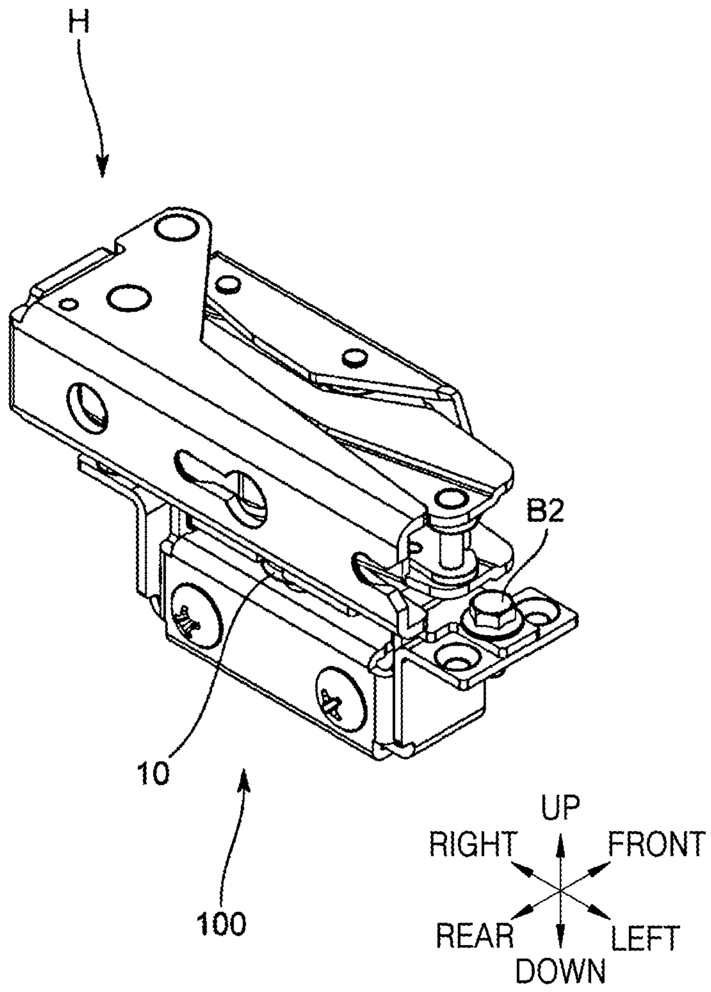
FIG. 8 is a perspective view of the door position adjustment device according to an embodiment of the disclosure.

Although, in the embodiments described above, while the door D is closed, the door position adjustment device 100 is arranged next to the hinge H, but the arranged position of the door position adjustment device 100 is not limited thereto. FIG. 8 is a perspective view of the door position adjustment device 100 according to an embodiment of the disclosure. Referring to FIG. 8, the door position adjustment device 100 may be arranged below the hinge H with respect to the hinge H arranged in the upper side of the door D. Although it is not illustrated in the drawings, the door position adjustment device 100 may be arranged above the hinge H with respect to the hinge H arranged in the lower side of the door D.

Although, in the embodiments described above, the two door position adjustment devices 100 installed in each of the upper and lower sides of the door D are described as having a vertical symmetrical structure, the disclosure is not necessarily limited thereto. Furthermore, the two door position adjustment devices 100 do not need to have the same configuration. For example, the door position adjustment device 100 in the upper side may have a structure to adjust the position of the door D in three directions of the up-down, left-right, and front-rear directions, whereas the door position adjustment device 100 in the lower side may have a structure to adjust the position of the door D only in one direction of the up-down direction.

Figure 9:
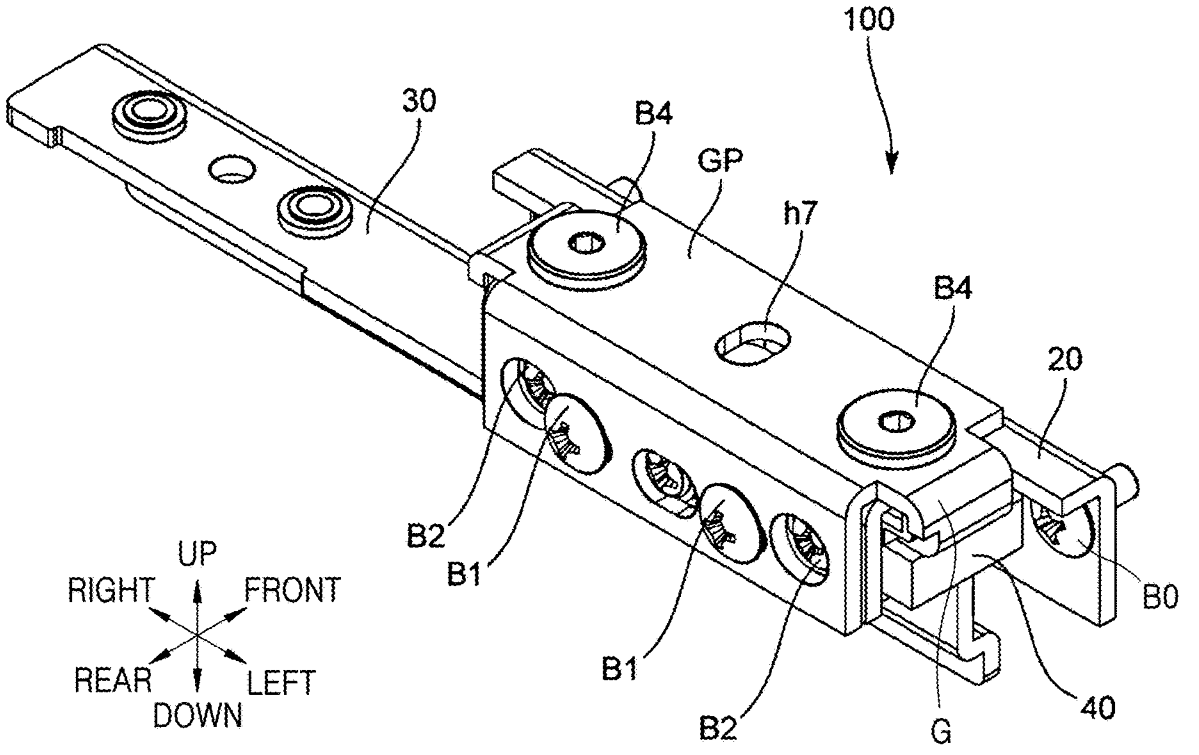
FIG. 9 is a perspective view of the door position adjustment device according to an embodiment of the disclosure.
Figure 10:
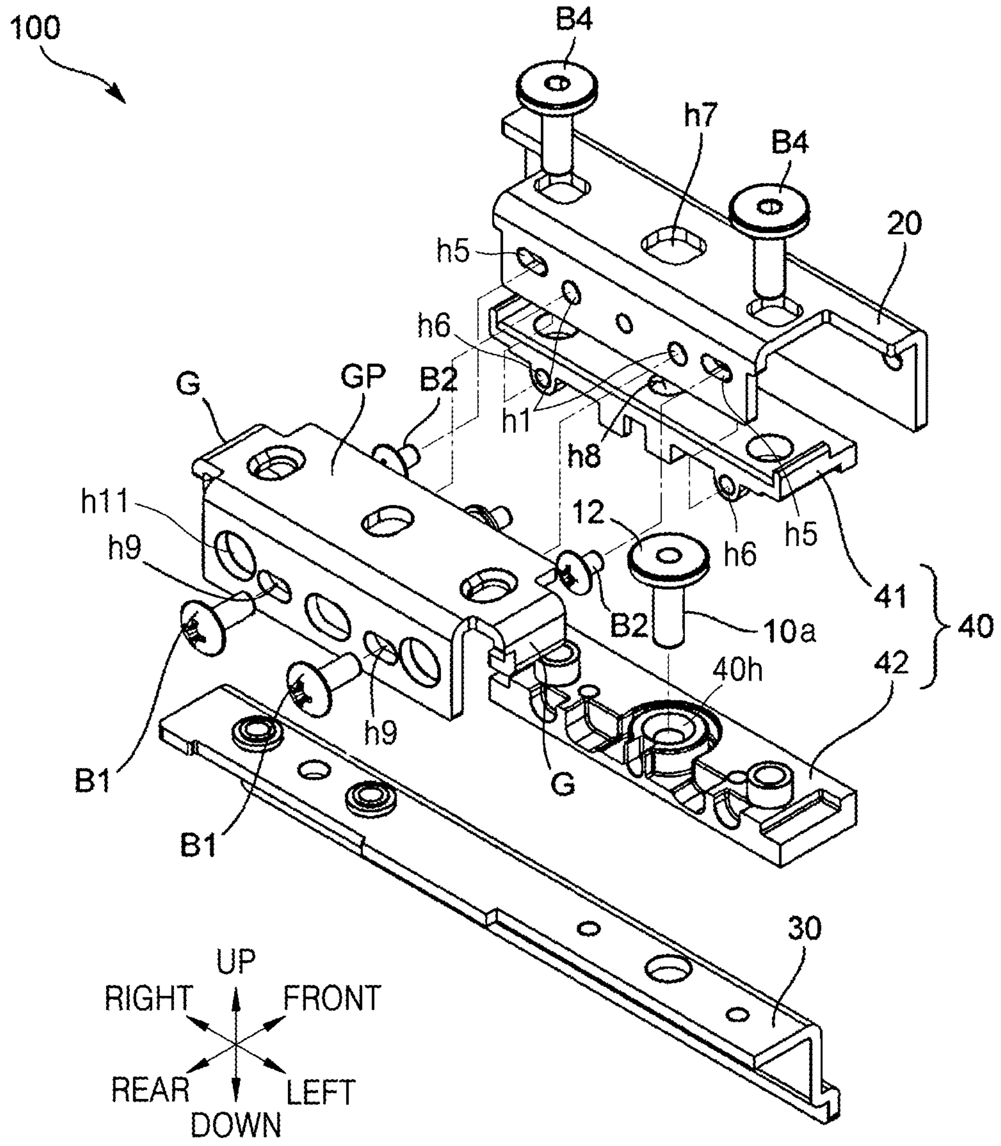
FIG. 10 is an exploded perspective view of the door position adjustment device according to the embodiment of the disclosure illustrated in FIG. 9.

The adjustor block 40 may have a structure that is divided into a plurality of components. FIG. 9 is a perspective view of the door position adjustment device 100 according to an embodiment of the disclosure. FIG. 10 is an exploded perspective view of the door position adjustment device 100 according to the embodiment of the disclosure illustrated in FIG. 9.

Referring to FIGS. 9 and 10, the adjustor block 40 may include a first element 41 facing and in contact with the door base 20 from under the door base 20 and a second element 42 facing and in contact with the hinge base 30 from above the hinge base 30. A vertical adjustment screw 10*a* is provided between the first element 41 and the second element 42. The adjustor block 40 including the first element 41 and the second element 42 is provided between the door base 20 and the hinge base 30.

The first element 41 extends in the width direction of the door D, that is, in the left-right direction, and faces and contacts the lower surface of the door base 20. The second element 42 extends in the width direction of the door D, that is, in the left-right direction, and faces and contacts the upper surface of the hinge base 30 with the vertical adjustment screw 10*a* between the first element 41 and the second element 42. The screw hole 40*h*, to which the vertical adjustment screw 10*a* is fastened, is provided in the second element 42.

The vertical adjustment screw 10*a* is different from the vertical adjustment screw 10 described above in that the former does not include the connection portion 11. The vertical adjustment screw 10 may be screw-coupled to at least one of the first element 41 or the second element 42. In the present embodiment, the vertical adjustment screw 10*a* is screw-coupled to the screw hole 40*h* provided in the second element 42. The vertical adjustment screw 10*a* includes a head portion 12 that is arranged in contact with the lower surface of the first element 41. The vertical adjustment screw 10*a* may move the first element 41 and the door base 20 in the vertical direction by a tightening amount and a loosening amount in the vertical direction with respect to the second element 42. The door base 20, the first element 41, the second element 42, and the hinge base 30 may be made into an assembly by a plurality of screw members B4. For example, the screw members B4 may be fastened to the hinge base 30 by passing through the first element 41 and the second element 42 from the door base 20. The screw members B4 may be the same member as the vertical adjustment screw 10*a*.

Adjustment holes h7 and h8 to access the vertical adjustment screw 10*a* are provided in the first element 41 and the door base 20, respectively. The adjustment holes h7 and h8 are formed at positions corresponding to the head portion 12 of the vertical adjustment screw 10*a* of each of the first element 41 and the door base 20. A tool, such as a wrench and the like, is inserted into a tool hole 12*h* formed in the head portion 12 of the vertical adjustment screw 10*a*, through the adjustment holes h7 and h8, and the vertical adjustment screw 10*a* may be tightened or loosened.

When the vertical adjustment screw 10*a* is loosened from the second element 42, the head portion 12 pushes the first element 41 upwards so that the door base 20 and the door D are moved upwards with the first element 41. Meanwhile, when the vertical adjustment screw 10*a* is tightened into the second element 42, the door base 20 is lowered with the vertical adjustment screw 10*a* so that the door D is lowered.

The door position adjustment device 100 further includes the guide portion G that guides the movement of the door D. The guide portion G guides the movement of the door D in the front-rear direction by guiding the movement of the door base 20 in the front-rear direction. The guide portion G may be formed as the opposite end portions of a guide plate GP in the left-right direction are bent downwards, with the guide plate GP covering the door base 20 from above. The guide portion G may be provided as a pair of guide portions G and, in such cases, the door base 20 is located between the pair of guide portions G. Accordingly, the guide portion G that guides the movement of the door base 20 in the front-rear direction may be implemented.

Although, in the embodiments described above, the position of the door D is adjusted in the front-rear direction by a combination of the front-rear adjusting and fixing screw B1 and the slot, in the door position adjustment device 100 illustrated in FIGS. 9 and 10, the position of the door D is adjusted in the front-rear direction by tightening or loosening the front-rear adjusting and fixing screw B1. Referring to FIGS. 9 and 10, the front-rear adjusting and fixing screw B1 is fastened to the first through hole h1 of the door base 20 through a ninth through hole h9 provided in the guide plate GP. The ninth through hole h9 has a slot shape extending in the left-right direction to enable the adjustment of the position of the door D in the left-right direction described below. The first through hole h1 may include a female threaded portion. The front-rear adjusting and fixing screw B1 is fastened to the first through hole h1 by passing through the ninth through hole h9, and moves the door base 20 in the front-rear direction by a tightening amount and a loosening amount in the front-rear direction. For the adjustment of the position of the door D in the front-rear direction, each of the screw members B4 are loosened. When there is the left-right adjusting and fixing screw B2, the left-right adjusting and fixing screw B2 is loosened as well. Then, by tightening or loosening the front-rear adjusting and fixing screw B1, the door base 20 is moved relative to the guide plate GP in a front-rear direction. Next, by tightening each of the screw members B4, the door base 20 is fixed to the adjustor block 40. After adjusting the position of the door base 20 in the left-right direction as described below, the left-right adjusting and fixing screw B2 is tightened.

While, in the embodiments described above, the tightening/loosening direction of the left-right adjusting and fixing screw B2 is a vertical direction, in the door position adjustment device 100 illustrated in FIGS. 9 and 10, the tightening/loosening direction of the left-right adjusting and fixing screw B2 is the thickness direction of the door D, that is, in the front-rear direction. Referring to FIGS. 9 and 10, the fifth through hole h5 having a slot shape extending in the left-right direction is provided in the door base 20. The sixth through hole h6 aligned with the fifth through hole h5 in the front-rear direction is provided in the adjustor block 40, for example, the first element 41. The left-right adjusting and fixing screw B2 is fastened to the sixth through hole h6 by passing through the fifth through hole h5 having a slot shape. The left-right adjusting and fixing screw B2 is located inside the guide plate GP, and may be accessible through an adjustment hole h11 provided in the guide plate GP, for example, the side ends of the guide plate GP in the front-rear direction. For the adjustment of the position of the door D in the left-right direction, first, the screw members B4 and the left-right adjusting and fixing screw B2 are loosened. Next, the door base 20 is moved in the left-right direction relative to the adjustor block 40. Next, a tool is coupled to the left-right adjusting and fixing screw B2 through the adjustment hole h11 and fastens the adjusting and fixing screw B2 to fix the door base 20 to the adjustor block 40.

As such, by the door position adjustment device 100 illustrated in FIGS. 9 and 10, the position of the door D may be steplessly adjusted in the up-down, left-right, and front-rear directions, and for example, when the door position adjustment device 100 illustrated in FIGS. 9 and 10 is applied to a built-in type refrigerator, the inclination of a door, a step from an adjacent cabinet, and the like are removed so that appearance quality (designability) may be guaranteed.

The door position adjustment device 100 according to the disclosure is not limited to usage for the refrigerator R, and may be used for various cabinet products, such as a clothing care device for storing clothes, and the like. In particular, the door position adjustment device 100 according to the disclosure is effective for products in which the hinge H may not be arranged inside cabinet.

For example, the clothing care device refers to a device that removes dust from clothes using vibrations and the like, or removes smell, contamination, and the like of clothes through a steam process and the like. The structure of the clothing care device is briefly described with reference to FIG. 1. Referring to FIG. 1, the clothing care device may include the cabinet C for storing clothes, the door D of a single door type or a double door type installed on the cabinet C, the hinge H rotatably supporting the door D to be rotatable with respect to the cabinet C about a rotation axis defined through the hinge H, and the door position adjustment device 100 provided between the door D and the hinge H to adjust the position of the door D. The cabinet C forms a space for storing clothes. The cabinet C may be equipped with various devices to care for clothes, such as a clothes stand that can hold clothes, a vibration device that vibrates the clothes stand, an air blower, a steam generator, and the like. The structure described with reference to FIGS. 1 to 10 may be employed as the door position adjustment device 100. In this case, in the descriptions in FIGS. 1 to 10, the refrigerator R may be regarded as the clothing care device.

The disclosure provides a refrigerator employing a door position adjustment device capable of continuously and steplessly (i.e., continuously or without discontinuous steps) adjusting the position of a door. A refrigerator according to an aspect of the disclosure includes a cabinet C; a door D to open/close an opening of the cabinet; a hinge H supporting the door to be rotatable with respect to the cabinet C about a rotation axis defined through the hinge H; and a door position adjustment device 100 provided between the door and the hinge and configured to adjust a position of the door. The door position adjustment device includes a vertical adjustment screw 10 or 10*a*, each including a threaded portion provided between the door D and the hinge and configured to adjust the position of the door in a vertical direction by a tightening amount and a loosening amount. As such, according to the door position adjustment device 100 configured as above, as the position of the door D in the vertical direction is adjusted using a screw (vertical adjustment screw), the position of the door D in the vertical direction may be adjusted steplessly. For example, when the door position adjustment device is applied to a built-in type refrigerator, appearance quality may be guaranteed by removing the inclination of a door, a misalignment with an adjacent cabinet, or the like.

In an embodiment, the door position adjustment device 100 may include the front-rear adjusting and fixing screw B1 that adjusts the position of the door D in a front-rear direction. Accordingly, for example, when the door position adjustment device 100 is applied to a built-in type refrigerator, the position of a design panel D1 may be aligned with an adjacent cabinet or a wall surface.

In an embodiment, the door position adjustment device 100 may include the left-right adjusting and fixing screw B2 that adjusts the position of the door D in a left-right direction. Accordingly, the refrigerator may be aligned with the cabinet C or a wall surface adjacent in the left-right direction such that a gap from the cabinet or a wall surface adjacent in the left-right direction may be equalized, and thus, designability provided with the adjacent cabinet or the wall surface in the left-right direction may be guaranteed.

In an embodiment, the door position adjustment device 100 may be located in a center side in a width direction of the door D with respect to the hinge H. Accordingly, the door position adjustment device 100 may be prevented from interfering with a gasket and a gasket groove arranged in front of the hinge H. It is effective when a gap between the hinge H and the door D is small, in particular when there is little space below the hinge H.

The door position adjustment device 100 may have various structures. In an embodiment, the door position adjustment device 100 may include the door base 20 fixed to the door D and the hinge base 30 fixed to the hinge H. The vertical adjustment screw 10 or 10*a* may include the connection portion 11 connected to the door base 20 to restrict the movement of the door base 20 in the vertical direction, and may move the door base 20 in the vertical direction by a tightening amount and a loosening amount in the vertical direction with respect to the hinge base 30.

In an embodiment, the door position adjustment device 100 may include the adjuster block 40 provided between the door base 20 and the hinge base 30 and including the screw hole 40*h*, to which the vertical adjustment screw is screw-coupled, formed therein. The door base 20 may move in the vertical direction with respect to the adjustor block 40.

In an embodiment, the first through hole h1 having a slot shape extending in the front-rear direction is provided in the door base 20, so that the door base 20 may be moved in the front-rear direction with respect to the adjustor block 40. The second through hole h2 aligned with the first through hole h1 may be provided in the adjustor block 40. The front-rear adjusting and fixing screw B1 may be fastened to the second through hole h2 by passing through the through hole h1.

In an embodiment, the third through hole h3 aligned with the second through hole h2 may be provided in the hinge base 30. The front-rear adjusting and fixing screw B1 may be fastened to the third through hole h3 by passing through the first through hole h1 and the second through hole h2.

In an embodiment, the door position adjustment device 100 may include the slide plate 50 coupled to the hinge base 30 to be slidable in the left-right direction and including the fifth through hole h5 having a slot shape extending in the left-right direction. The adjustor block 40 may be fixed to the slide plate 50. The sixth through hole h6 aligned with the fifth through hole h5 may be provided in the hinge base 30. The left-right adjusting and fixing screw B2 may be fastened to the sixth through hole h6 by passing through the fifth through hole h5.

In an embodiment, the door position adjustment device 100 may include the door base 20 fixed to the door D, the hinge base 30 fixed to the hinge H, and the adjustor block 40 including the first element 41 facing and in contact with the door base 20 from under the door base 20 and the second element 42 facing and in contact with the hinge base 30 from above the hinge base 30, and provided between the door base 20 and the hinge base 30. The screw hole 40*h*, to which the vertical adjustment screw 10*a* is fastened, may be provided in the second element. The vertical adjusting and fixing screw 10*a* may be provided between the first element and the second element and may move the first element and the door base 20 in the vertical direction by a tightening amount and a loosening amount in the vertical direction with respect to the second element.

In an embodiment, the door position adjustment device 100 may include the guide plate GP that guides the movement of the door base 20 in the front-rear direction and includes the ninth through hole h9 penetrating the guide plate GP in the front-rear direction. The first through hole h1 may be provided in the door base 20 by penetrating the door base 20 in the front-rear direction. The front-rear adjusting and fixing screw B1 may be fastened to the first through hole h1 by passing through the ninth through hole h9 and may move the door base 20 in the front-rear direction by a tightening amount and a loosening amount in the front-rear direction.

In an embodiment, the fifth through hole h5 having a slot shape extending in the left-right direction may be provided in the door base 20. The sixth through hole h6 aligned with the fifth through hole h5 may be provided in the first element. The left-right adjusting and fixing screw B2 may be fastened to the sixth through hole h6 by passing through the fifth through hole h5.

In an embodiment, the door position adjustment device 100 may include the door base 20, the adjustor block 40, and the screw members B4 that fix the guide plate GP to the hinge base 30.

In an embodiment, the hinge base 30 may be formed by the extension portion H3 that is a partial extension of the movable arm H2 of the hinge H. Accordingly, the number of components of the door position adjustment device 100 may be reduced, and costs may be reduced.

Figure 11:
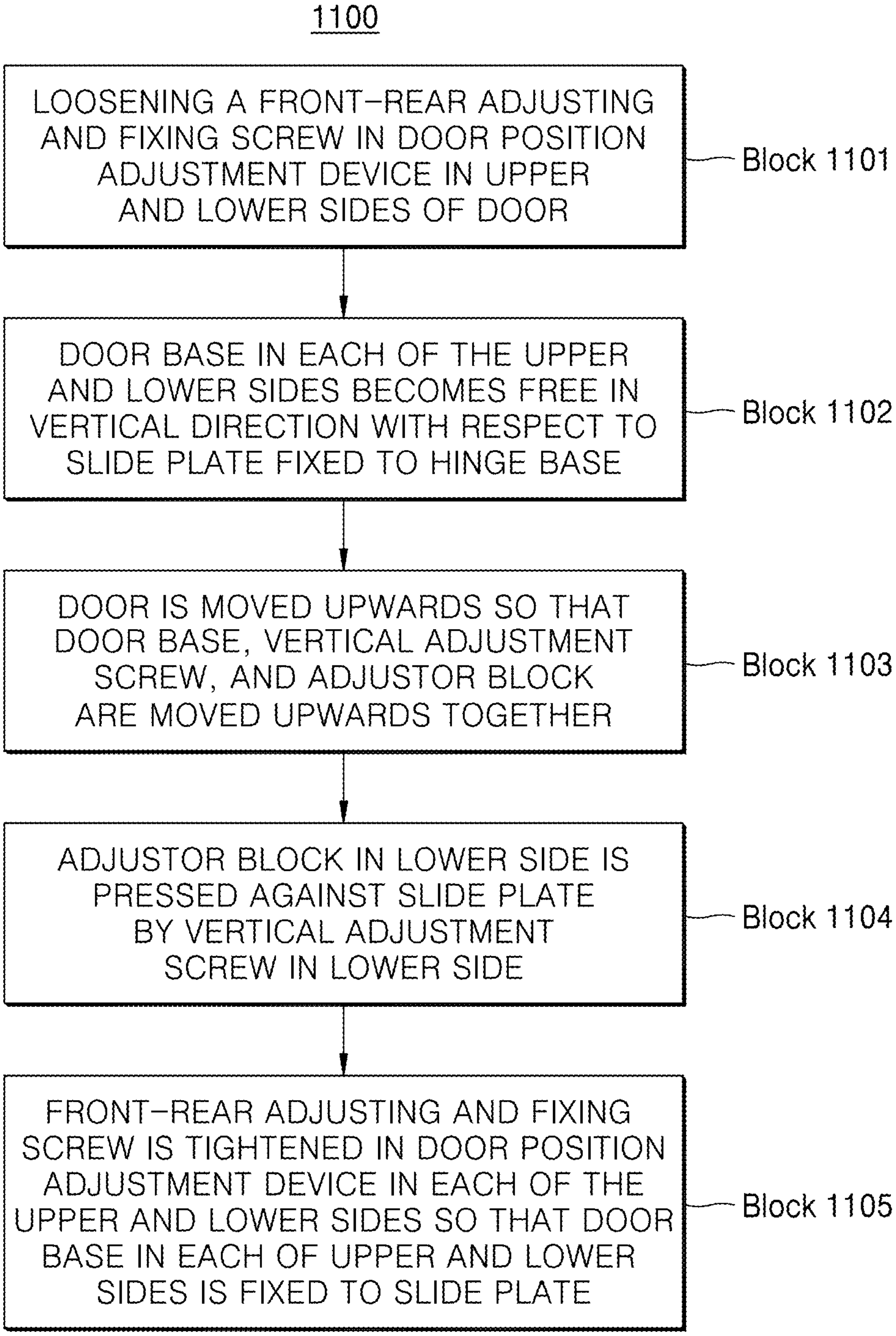
FIG. 11 is a flow diagram illustrating a method of operating a door position adjustment device in accordance with embodiments.

With reference back to FIGS. 5A, 5B and 5C and with additional reference to FIG. 11, a method 1100 of operating the door position adjustment device 100 will now be described. As shown in FIG. 11, in each of the upper and lower sides of the door D, the front-rear adjusting and fixing screw B1 is first loosened in the door position adjustment device 100 (block 1101), and thus, as illustrated in the diagram of FIG. 5A, the door base 20 in each of the upper and lower sides becomes free in the vertical direction with respect to the slide plate 50 fixed to the hinge base 30 (block 1102). Next, for example, as illustrated in the diagram of FIG. 5B, when the vertical adjustment screw 10 in the upper side is loosened, the door D is moved upwards, and according thereto, the door base 20, the vertical adjustment screw 10, and the adjustor block 40 in the lower side are moved upwards together (block 1103). In other words, the door base 20, the vertical adjustment screw 10, and the adjustor block 40 in the lower side are close together to the slide plate 50 in the lower side. The adjustor block 40 in the lower side is pressed against the slide plate 50 by using the vertical adjustment screw 10 in the lower side (block 1104), and in this state, the front-rear adjusting and fixing screw B1 is tightened in the door position adjustment device 100 in each of the upper and lower sides so that the door base 20 in each of the upper and lower sides is fixed to the slide plate 50 (block 1105), and as illustrated in the diagram of FIG. 5C, the adjustment of the position of the door D in the vertical direction is completed.

According to the embodiments described above, even when a plurality of refrigerators are arranged, or a refrigerator is inserted in an accommodation space, the same operation and effect as the door position adjustment device 100 described above, that is, the operation and effect to guarantee designability by removing the inclination of a door D, a step from an adjacent cabinet C, and the like may be implemented. The door position adjustment device 100 may be installed in each of the upper and lower sides of the door D. As the load of a door D is supported by two door position adjustment devices 100, there is little position change due to sagging of the door D and the like, and fine adjustment of the door D is possible. The refrigerator may have a structure capable of replacing a design panel D1 facing the front side of the door D, and the door position adjustment device 100 is effective to a refrigerator having such a structure.

The hinge H may include a multi-axis hinge that rotates and pushes the door D toward the front side. For example, when one-axis hinge is used for a built-in refrigerator, to guarantee an opening angle of a door D and simultaneously avoid interference with an adjacent cabinet, the door D of the refrigerator needs to slightly protrude toward the front side further than the cabinet. Then, a design panel D1 of the refrigerator may not be arranged parallel to a design panel of an adjacent cabinet, and thus, designability may be damaged. When a multi-axis hinge is employed, a large opening angle of a door D is secured and simultaneously the positions of design panels may be arranged parallel to each other, and thus, designability may be guaranteed. As the multi-axis hinge includes a plurality of link members and a plurality of rotation axes, door sagging may easily occur in a refrigerator using a multi-axis hinge. Accordingly, the operation and effect by the door position adjustment device described above may be remarkably exerted in the refrigerator using a multi-axis hinge A clothing care device according to an aspect of the disclosure includes: a cabinet C storing clothes; a door D to open/close an opening of the cabinet; a hinge H supporting the door D to be rotatable with respect to the cabinet C; and a door position adjustment device 100 provided between the door D and the hinge H and configured to adjust a position of the door D, wherein the door position adjustment device 100 includes a vertical adjustment screw 10 or 10*a* including a threaded portion 13 provided between the door D and the hinge H and configured to adjust the position of the door D in a vertical direction by a tightening amount and a loosening amount in the vertical direction. Accordingly, the same effect as the refrigerator described above may be obtained.

As describe above, although the refrigerator and the clothing care device according to the disclosure have been described by limited embodiments and the drawings, those skilled in the art to which the disclosure pertains could make various modifications and changes from these descriptions.

The invention claimed is:

1. A refrigerator comprising:
a cabinet;
a door to open/close an opening of the cabinet;
a hinge supporting the door to be rotatable with respect to the cabinet;
a door position adjustment device provided between the door and the hinge and configured to adjust a position of the door,
wherein the door position adjustment device comprises;
a door base fixed to the door;
a hinge base fixed to the hinge;
a vertical adjustment screw provided between the door and the hinge, and configured to adjust a position of the door in a vertical direction by a tightening amount and a loosening amount in the vertical direction; and
an adjuster block provided between the door base and the binge base and including a screw hole to which the vertical adjustment screw is screw-coupled,
wherein the vertical adjustment screw includes a threaded portion, and a connection portion connected to the door base to restrict a movement of the door base in the vertical direction,
wherein the vertical adjustment screw moves the door base in the vertical direction by a tightening amount and a loosening amount in the vertical direction with respect to the hinge base, and
wherein the door base is movable in the vertical direction with respect to the adjustor block.

2. The refrigerator of claim 1, wherein
the door position adjustment device comprises a front-rear adjusting and fixing screw that adjusts the position of the door in a front-rear direction.

3. The refrigerator of claim 1, wherein
the door position adjustment device comprises a left-right adjusting and fixing screw that adjusts the position of the door in a left-right direction.

4. The refrigerator of claim 1, wherein
the door position adjustment device is located in a center side in a width direction of the door with respect to the hinge.

5. The refrigerator of claim 1, wherein the door position adjustment device comprises a front-rear adjusting and fixing screw that adjusts the position of the door in a front-rear direction, and the refrigerator further comprises:
a first through hole having a slot shape extending in the front-rear direction is provided in the door base, so that the door base is movable in the front-rear direction with respect to the adjustor block,
a second through hole aligned with the first through hole is provided in the adjustor block, and
the front-rear adjusting and fixing screw is fastened to the second through hole by passing through the through hole.

6. The refrigerator of claim 5, wherein
a third through hole aligned with the second through hole is provided in the hinge base, and
the front-rear adjusting and fixing screw is fastened to the third through hole by passing through the first through hole and the second through hole.

7. The refrigerator of claim 1, wherein the door position adjustment device comprises a left-right adjusting and fixing screw that adjusts the position of the door in a left-right direction and the refrigerator further comprises:

a slide plate coupled to the hinge base to be slidable in the left-right direction and including a fifth through hole having a slot shape extending in the left-right direction, wherein the adjustor block is fixed to the slide plate, a sixth through hole aligned with the fifth through hole is provided in the hinge base, and the left-right adjusting and fixing screw is fastened to the sixth through hole by passing through the fifth through hole.

8. The refrigerator of claim 1, wherein the hinge base is formed by an extension portion that is a partial extension of a movable arm of the hinge.

9. A refrigerator comprising:

a cabinet:

a door to open/close an opening of the cabinet;

a hinge supporting the door to be rotatable with respect to the cabinet; and a door position adjustment device provided between the door and the hinge and configured to adjust a position of the door, wherein the door position adjustment device comprises:

a door base fixed to the door;

a hinge base fixed to the hinge; and an adjustor block comprising a first element facing and in contact with the door base from under the door base and a second element facing and in contact with the hinge base from above the hinge base, and provided between the door base and the hinge base; and a vertical adjustment screw including a thread portion, provided between the door and the hinge, and configured to adjust a position of the door in a vertical direction by a tightening amount and a loosening amount in the vertical direction, wherein a screw hole, to which the vertical adjustment screw is fastened, is provided in the second element, and the vertical adjusting and fixing screw is provided between the first element and the second element and moves the first element and the door base in the vertical direction by a tightening amount and a loosening amount in the vertical direction with respect to the second element.

10. The refrigerator of claim 9, wherein the door position adjustment device comprises a front-rear adjusting and fixing screw that adjusts the position of the door in a front-rear direction, and the refrigerator further comprises:

a guide plate that guides a movement of the door base in the front-rear direction and includes a ninth through hole penetrating the guide plate in the front-rear direction, a first through hole is provided in the door base by penetrating the door base in the front-rear direction, and the front-rear adjusting and fixing screw is fastened to the first through hole by passing through the ninth through hole and moves the door base in the front-rear direction by a tightening amount and a loosening amount in the front-rear direction.

11. The refrigerator of claim 9, wherein:

the door position adjustment device comprises a left-right adjusting and fixing screw that adjusts the position of the door in a left-right direction, a fifth through hole having a slot shape extending in the left-right direction is provided in the door base, a sixth through hole aligned with the fifth through hole is provided in the first element, and the left-right adjusting and fixing screw is fastened to the sixth through hole by passing through the fifth through hole.

12. The refrigerator of claim 9, further comprising:

a guide plate that guides a movement of the door base in the front-rear direction and includes a ninth through hole penetrating the guide plate in the front-rear direction; and a screw member that fixes the door base, the adjustor block, and the guide plate to the hinge base.

13. A clothing care device comprising:

a cabinet for storing clothes;

a door to open/close an opening of the cabinet;

a hinge supporting the door to be rotatable with respect to the cabinet;

a door position adjustment device provided between the door and the hinge and configured to adjust a position of the door, wherein the door position adjustment device comprises;

a door base fixed to the door;

a hinge base fixed to the hinge;

a vertical adjustment screw provided between the door and the hinge, and configured to adjust the position of the door in a vertical direction by a tightening amount and a loosening amount in the vertical direction; and an adjuster block provided between the door base and the hinge base and including a screw hole to which the vertical adjustment screw is screw-coupled, wherein the vertical adjustment screw includes a threaded portion, and a connection portion connected to the door base to restrict a movement of the door base in the vertical direction, wherein the vertical adjustment screw moves the door base in the vertical direction by a tightening amount and a loosening amount in the vertical direction with respect to the hinge base, and wherein the door base is movable in the vertical direction with respect to the adjustor block.

* * * * *